US007265162B2

(12) United States Patent
Yandrasits et al.

(10) Patent No.: US 7,265,162 B2
(45) Date of Patent: *Sep. 4, 2007

(54) BROMINE, CHLORINE OR IODINE FUNCTIONAL POLYMER ELECTROLYTES CROSSLINKED BY E-BEAM

(75) Inventors: Michael A. Yandrasits, Hastings, MN (US); Steven J. Hamrock, Stillwater, MN (US); Klaus Hintzer, Kastl (DE); Arne Thaler, Altoetting (DE); Tatsuo Fukushi, Woodbury, MN (US); Naiyong Jing, Woodbury, MN (US); Kai Helmut Lochhaas, Neuoetting (DE)

(73) Assignee: 3M Innovative Properties Company, Saint Paul, MN (US)

( * ) Notice: Subject to any disclaimer, the term of this patent is extended or adjusted under 35 U.S.C. 154(b) by 54 days.

This patent is subject to a terminal disclaimer.

(21) Appl. No.: 10/712,590

(22) Filed: Nov. 13, 2003

(65) Prior Publication Data

US 2005/0107490 A1    May 19, 2005

(51) Int. Cl.
*C08F 2/46* (2006.01)
(52) U.S. Cl. ............... 522/156; 522/150; 522/155; 522/184; 522/185; 522/186; 522/187; 522/189; 522/109; 522/110; 522/111; 522/112
(58) Field of Classification Search ............... 522/1, 522/2, 150, 155, 156, 184, 185, 186, 187, 522/188, 189; 428/421, 422, 308.4; 52/109–112
See application file for complete search history.

(56) References Cited

U.S. PATENT DOCUMENTS

| | | | |
|---|---|---|---|
| 3,282,875 A | 11/1966 | Connolly et al. |
| 3,635,926 A | 1/1972 | Gresham et al. |
| 3,784,399 A | 1/1974 | Grot |
| 3,853,828 A | 12/1974 | Wall et al. |
| 4,000,356 A | 12/1976 | Weisgerber et al. |
| 4,073,752 A | 2/1978 | Ramp |
| 4,169,023 A | 9/1979 | Sata et al. |
| 4,214,060 A | 7/1980 | Apotheker et al. |
| 4,218,542 A | 8/1980 | Ukihashi et al. |
| 4,230,549 A | 10/1980 | D'Agostino et al. |
| 4,242,498 A | 12/1980 | Rosser et al. |
| 4,268,650 A | 5/1981 | Rose |
| 4,281,092 A | 7/1981 | Breazeale |
| 4,330,654 A | 5/1982 | Ezzell et al. |
| 4,334,082 A | 6/1982 | Resnick |
| 4,391,844 A | 7/1983 | Baczek et al. |
| 4,414,159 A | 11/1983 | Resnick |
| 4,440,917 A | 4/1984 | Resnick |
| 4,454,247 A | 6/1984 | Resnick |
| 4,470,889 A | 9/1984 | Ezzell et al. |
| 4,508,603 A | 4/1985 | Ukihashi et al. |
| 4,522,952 A | 6/1985 | Klein et al. |
| 4,602,045 A | 7/1986 | Markus et al. |
| 4,686,024 A | 8/1987 | Scherer, Jr. et al. |
| 4,734,474 A | 3/1988 | Hamada et al. |
| 4,743,419 A | 5/1988 | Bierschenk |
| 4,755,567 A | 7/1988 | Bierschenk et al. |
| 4,981,932 A | 1/1991 | Blaise et al. |
| 5,260,351 A | 11/1993 | Logothetis |
| 5,264,508 A | 11/1993 | Ishibe et al. |
| 5,330,626 A | 7/1994 | Banerjee |
| 5,466,930 A | 11/1995 | Schlenoff |
| 5,527,861 A | 6/1996 | Logothetis |
| 5,608,022 A | 3/1997 | Nakayama et al. |
| 5,693,748 A | 12/1997 | Ikeda et al. |
| 5,795,496 A | 8/1998 | Yen et al. |
| 5,798,417 A | 8/1998 | Howard, Jr. |
| 5,804,650 A | 9/1998 | Tsuda et al. |
| 5,852,148 A | 12/1998 | Behr et al. |
| 5,986,012 A | 11/1999 | Legare et al. |
| 6,011,074 A | 1/2000 | Sorenson et al. |

(Continued)

FOREIGN PATENT DOCUMENTS

DE    26 24 203    12/1976

(Continued)

OTHER PUBLICATIONS

Gab-Jin Hwang et al.; "Preparation Of Cation Exchange Membrane As A Separator For The All-Vanadium Redox Flow Battery", Journal of Membrane Science, Elsevier Scientific Publ. Company, Amsterdam, NL, vol. 120, No. 1, Oct. 30, 1996, pp. 55-67.

(Continued)

*Primary Examiner*—Sanza L. McClendon
(74) *Attorney, Agent, or Firm*—Philip Y. Dahl

(57) ABSTRACT

A method is provided for making a crosslinked polymer electrolyte, typically in the form of a membrane for use as a polymer electrolyte membrane in an electrolytic cell such as a fuel cell, as well as the polymer so made, the method comprising application of electron beam radiation to a highly fluorinated fluoropolymer comprising: a backbone derived in part from tetrafluoro-ethylene monomer, first pendent groups which include a group according to the formula —$SO_2X$, where X is F, Cl, Br, OH or —$O^-M^+$, where $M^+$ is a monovalent cation, and second pendent groups which include Br, Cl or I. Typically, the membrane has a thickness of 90 microns or less, more typically 60 or less, and most typically 30 microns or less.

21 Claims, 2 Drawing Sheets

U.S. PATENT DOCUMENTS

| | | | |
|---|---|---|---|
| 6,090,895 | A | 7/2000 | Mao et al. |
| 6,224,994 | B1 | 5/2001 | Asukabe et al. |
| 6,225,368 | B1 | 5/2001 | D'Agostino et al. |
| 6,242,123 | B1 | 6/2001 | Nezu et al. |
| 6,248,469 | B1 | 6/2001 | Formato et al. |
| 6,254,978 | B1 | 7/2001 | Bahar et al. |
| 6,255,370 | B1 | 7/2001 | Vizcaino et al. |
| RE37,307 | E | 8/2001 | Bahar et al. |
| 6,274,677 | B1 | 8/2001 | Tatemoto |
| 6,277,512 | B1 | 8/2001 | Hamrock et al. |
| 6,355,370 | B2 | 3/2002 | Katoh et al. |
| RE37,656 | E | 4/2002 | Bahar et al. |
| 6,365,769 | B1 | 4/2002 | Behr et al. |
| 6,380,337 | B2 | 4/2002 | Abe et al. |
| RE37,701 | E | 5/2002 | Bahar et al. |
| 6,387,964 | B1 | 5/2002 | D'Agostino et al. |
| 6,423,784 | B1 | 7/2002 | Hamrock et al. |
| 6,426,397 | B1 | 7/2002 | Armand et al. |
| 6,462,228 | B1 | 10/2002 | Dams |
| 6,498,216 | B1 | 12/2002 | Cheng |
| 6,503,378 | B1 | 1/2003 | Fisher |
| 6,552,135 | B2 | 4/2003 | Schnurnberger et al. |
| 6,624,328 | B1 | 9/2003 | Guerra |
| 6,649,703 | B2 | 11/2003 | Michot et al. |
| 6,667,377 | B2 | 12/2003 | Feiring et al. |
| 6,670,424 | B1 | 12/2003 | Michot et al. |
| 6,872,781 | B2 | 3/2005 | Hedhli et al. |
| 2002/0014405 | A1 | 2/2002 | Arcella et al. |
| 2002/0040106 | A1 | 4/2002 | Wlassics et al. |
| 2003/0032739 | A1 | 2/2003 | Kerres et al. |
| 2003/0092940 | A1 | 5/2003 | Hamrock |
| 2003/0181572 | A1 | 9/2003 | Tan et al. |
| 2003/0181615 | A1 | 9/2003 | Ameduri et al. |
| 2003/0208014 | A1 | 11/2003 | Kerres et al. |
| 2004/0241518 | A1 | 12/2004 | Yang |
| 2005/0096442 | A1 | 5/2005 | Thaler et al. |
| 2005/0107488 | A1* | 5/2005 | Yandrasits et al. .......... 522/156 |
| 2005/0107489 | A1 | 5/2005 | Yandrasits et al. |
| 2005/0107532 | A1 | 5/2005 | Guerra et al. |
| 2005/0113528 | A1 | 5/2005 | Jing et al. |
| 2005/0131096 | A1 | 6/2005 | Jing et al. |
| 2005/0131097 | A1* | 6/2005 | Jing et al. ...................... 522/1 |
| 2005/0137351 | A1 | 6/2005 | Guerra |

FOREIGN PATENT DOCUMENTS

| | | |
|---|---|---|
| DE | 26 38 791 | 3/1977 |
| DE | 100 21 104 A1 | 11/2001 |
| EP | 0 048 964 A2 | 4/1982 |
| EP | 0 407 937 | 1/1991 |
| EP | 0 422 231 B1 | 12/1995 |
| EP | 1 085 038 A1 | 3/2001 |
| EP | 1 091 435 A1 | 4/2001 |
| EP | 1 179 548 A1 | 2/2002 |
| EP | 1 359 142 A1 | 11/2003 |
| FR | 2 387 260 | 12/1976 |
| JP | 53-29291 | 3/1978 |
| JP | 53-97988 | 8/1978 |
| JP | 53-134088 | 11/1978 |
| JP | 54/052690 * | 4/1979 |
| JP | 54-52690 | 4/1979 |
| JP | 56-72002 | 6/1981 |
| JP | SHO 60-250009 | 12/1985 |
| JP | SHO 62-288617 | 12/1987 |
| JP | 64-3140 | 1/1989 |
| JP | 5-314960 | 11/1993 |
| JP | 8-239494 | 9/1996 |
| JP | 2000-119420 | 4/2000 |
| JP | 2000-268834 | 9/2000 |
| JP | 2001-29800 | 2/2001 |
| JP | 2001-176524 | 6/2001 |
| JP | 2001-354641 | 12/2001 |
| JP | 2002-003466 | 1/2002 |
| JP | 2002-313364 | 10/2002 |
| WO | WO94/03503 | 2/1994 |
| WO | WO97/17381 | 5/1997 |
| WO | WO99/38897 | 8/1999 |
| WO | WO00/52060 | 9/2000 |
| WO | WO01/27167 A1 | 4/2001 |
| WO | WO01/87992 A2 | 11/2001 |
| WO | WO01/96268 A2 | 12/2001 |
| WO | WO02/050142 A1 | 6/2002 |
| WO | WO02/062749 A1 | 8/2002 |
| WO | WO02/087001 A2 | 10/2002 |
| WO | WO02/103834 A1 | 12/2002 |
| WO | WO03/004463 A1 | 1/2003 |
| WO | WO03/022892 A2 | 3/2003 |

OTHER PUBLICATIONS

U.S. Appl. No. 10/325,278, filed Dec. 19, 2002; Polymer Electrolyte Membrane.

Kirk-Othmer, *Encyclopedia of Chemical Technology*, 3d ed., vol. 10, (1980), pp. 840-855.

* cited by examiner

BROMINE, CHLORINE OR IODINE FUNCTIONAL POLYMER ELECTROLYTES CROSSLINKED BY E-BEAM

FIELD OF THE INVENTION

This invention relates to a method of making a crosslinked polymer electrolyte, typically in the form of a membrane for use as a polymer electrolyte membrane in an electrolytic cell such as a fuel cell, by application of electron beam radiation to a highly fluorinated fluoropolymer comprising: a backbone derived in part from tetrafluoroethylene monomer, first pendent groups which include a group according to the formula —$SO_2X$, where X is F, Cl, Br, OH or —$O^-M^+$, where $M^+$ is a monovalent cation, and second pendent groups which include Br, Cl or I.

BACKGROUND OF THE INVENTION

U.S. Pat. No. 4,470,889 purportedly discloses an electrolytic cell separated into an anode chamber and a cathode chamber by a fluorinated polymer membrane; where the membrane comprises: (a) at least 60 mole percent [CFX—$CF_2$] where X=F or Cl; (b) an ion exchange equivalent weight of at least 600; (c) pendant sulfonyl ion exchange groups; and (d) pendant substantially fluorinated carbon groups which have no ion exchange functionality. The pendant substantially fluorinated carbon groups which have no ion exchange functionality may comprise Br.

U.S. Patent Pub. No. U.S. 2003/0181615 A1 purportedly discloses polymers of certain fluorosulfonated fluoromonomers, certain brominated fluoromonomers, and no tetrafluoroethylene (TFE) monomer. ('615 at para. 234 and at para. 64-68). The reference purportedly discloses particular methods of crosslinking.

U.S. Pat. No. 5,260,351 purportedly discloses perfluoroelastomers cured by radiation in the absence of curing agents. The reference purportedly relates to curing of fully fluorinated polymers, such as those prepared from tetrafluoroethylene, a perfluoralkyl perfluorovinyl ether, and cure site or crosslinking units providing at least one of nitrile, perfluorophenyl, bromine or iodine in the resulting terpolymer.

SUMMARY OF THE INVENTION

Briefly, the present invention provides a method of making a crosslinked polymer comprising the steps of: a) providing a highly fluorinated fluoropolymer comprising: a backbone derived in part from tetrafluoroethylene monomer, first pendent groups which include a group according to the formula —$SO_2X$, where X is F, Cl, Br, OH or —$O^-M^+$, where $M^+$ is a monovalent cation, and second pendent groups which include Br, Cl or I, typically Br; and b) exposing said fluoropolymer to electron beam radiation so as to result in the formation of crosslinks. The method may additionally comprise, prior to said step b), the step of: c) forming the fluoropolymer into a membrane. Typically, the membrane has a thickness of 90 microns or less, more typically 60 or less, and most typically 30 microns or less. Typically the highly fluorinated fluoropolymer is perfluorinated. Typically the first pendent groups are groups according to the formula —O—$(CF_2)_4$—$SO_2X$, and typically X is OH. Typically the fluoropolymer is exposed to greater than 1 Mrad of electron beam radiation more typically greater than 3 Mrad of electron beam radiation.

In another aspect, the present invention provides crosslinked polymers made according to any of the methods of the present invention.

What has not been described in the art, and is provided by the present invention, is a method of crosslinking highly fluorinated fluoropolymer comprising a backbone derived in part from tetrafluoroethylene monomer, first pendent groups which include a group according to the formula —$SO_2X$, where X is F, Cl, Br, OH or —$O^-M^+$, where $M^+$ is a monovalent cation, and second pendent groups which include Br, Cl or I, which is typically a membrane for use as a polymer electrolyte membrane, using electron beam radiation.

In this application:

"equivalent weight" (EW) of a polymer means the weight of polymer which will neutralize one equivalent of base;

"hydration product" (HP) of a polymer means the number of equivalents (moles) of water absorbed by a membrane per equivalent of sulfonic acid groups present in the membrane multiplied by the equivalent weight of the polymer; and "highly fluorinated" means containing fluorine in an amount of 40 wt % or more, typically 50 wt % or more and more typically 60 wt % or more.

DETAILED DESCRIPTION

Figure 1:
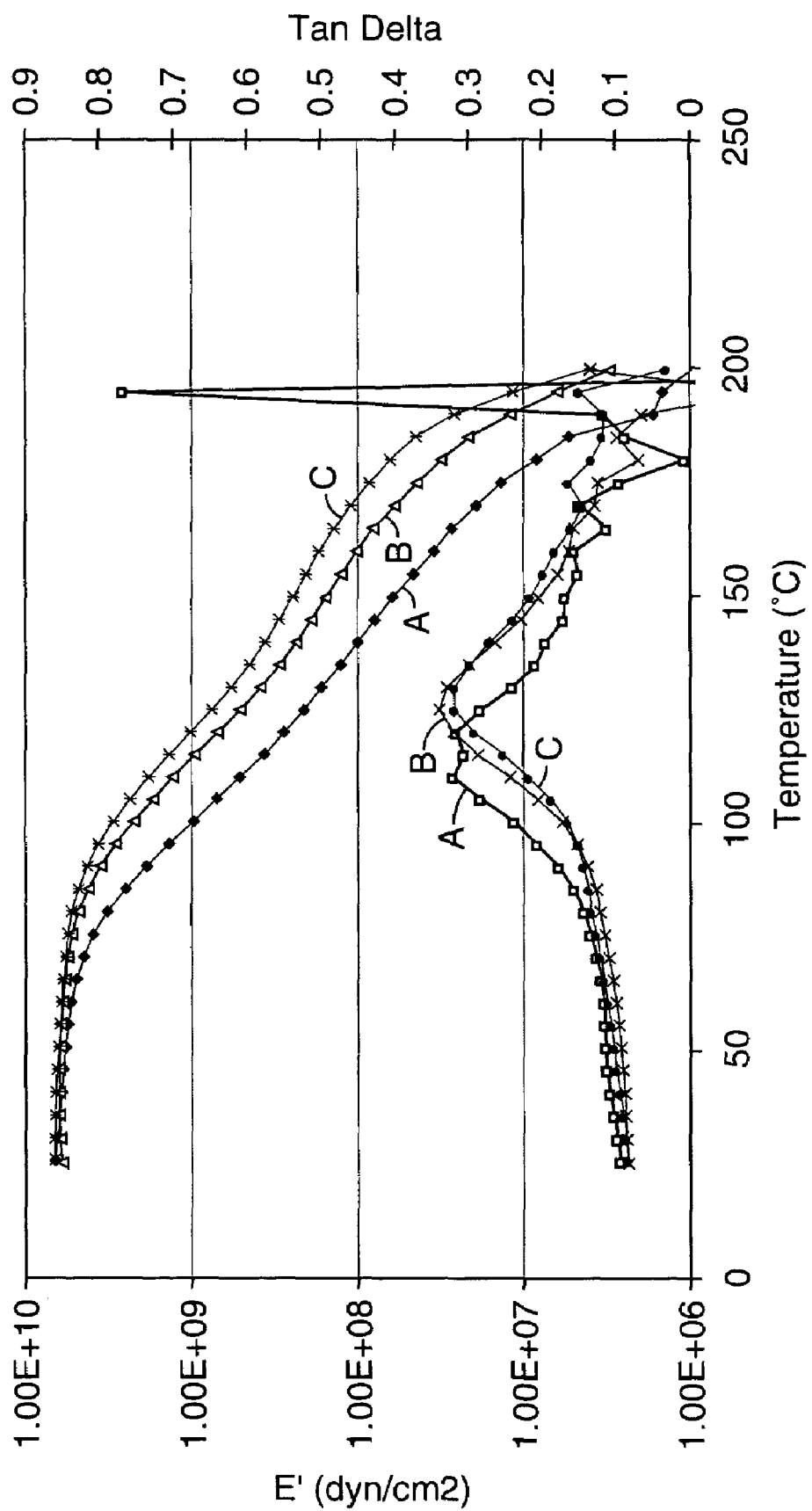
FIG. 1 is a graph demonstrating dynamic mechanical analysis (DMA) results for one comparative polymer (A) and two polymers according to the present invention (B, C).

The present invention provides a method of making a crosslinked polymer. The polymer to be crosslinked comprises: a backbone derived in part from tetrafluoroethylene (TFE) monomer, first pendent groups which include a group according to the formula —$SO_2X$, where X is F, Cl, Br, OH or —$O^-M^+$, where $M^+$ is a monovalent cation, and second pendent groups which include Br, Cl or I. Such polymers may be useful in the manufacture of polymer electrolyte membranes (PEM's), such as are used in electrolytic cells such as fuel cells.

PEM's manufactured from the crosslinked polymer according to the present invention may be used in the fabrication of membrane electrode assemblies (MEA's) for use in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. The five layers of a five-layer MEA are, in order: anode GDL, anode electrode layer, PEM, cathode electrode layer, and cathode GDL. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes H$^+$ ions readily.

The polymer to be crosslinked comprises a backbone, which may be branched or unbranched but is typically unbranched. The backbone is highly fluorinated and more typically perfluorinated. The backbone comprises units derived from tetrafluoroethylene (TFE), i.e., typically —$CF_2$—$CF_2$— units, and units derived from co-monomers, typically including at least one according to the formula $CF_2$=CY—R where Y is typically F but may also be $CF_3$, and where R is a first pendent group which includes a group according to the formula —$SO_2$X, where X is F, Cl, Br, OH, or —O$^-$M$^+$, where M$^{30}$ is a monovalent cation, typically an alkali metal cation such as Na$^+$. X is most typically OH. In an alternative embodiment, first side groups R may be added to the backbone by grafting. Typically, first side groups R are highly fluorinated and more typically perfluorinated. R may be aromatic or non-aromatic. Typically, R is —R$^1$—$SO_2$X, where R$^1$ is a branched or unbranched perfluoroalkyl or perfluoroether group comprising 1-15 carbon atoms and 0-4 oxygen atoms. R$^1$ is typically —O—R$^2$— wherein R$^2$ is a branched or unbranched perfluoroalkyl or perfluoroether group comprising 1-15 carbon atoms and 0-4 oxygen atoms. R$^1$ is more typically —O—R$^3$— wherein R$^3$ is a perfluoroalkyl group comprising 1-15 carbon atoms. Examples of R$^1$ include:

—($CF_2$)$_n$— where n is 1, 2, 3, 4, 5, 6, 7, 8, 9, 10, 11, 12, 13, 14 or 15

(—$CF_2$CF($CF_3$)—)$_n$ where n is 1, 2, 3, 4, or 5

(—CF($CF_3$)$CF_2$—)$_n$ where n is 1, 2, 3, 4, or 5 (—$CF_2$CF($CF_3$)—)$_n$—$CF_2$ 1, 2, 3 or 4

(—O—$CF_2$$CF_2$—)$_n$ where n is 1, 2, 3, 4, 5, 6 or 7

(—O—$CF_2$$CF_2$$CF_2$—)$_n$ where n is 1, 2, 3, 4, or 5

(—O—$CF_2$$CF_2$$CF_2$$CF_2$—)$_n$ where n is 1, 2 or 3

(—O—$CF_2$CF($CF_3$)—)$_n$ where n is 1, 2, 3, 4, or 5

(—O—$CF_2$CF($CF_2$$CF_3$)—)$_n$ where n is 1, 2 or 3

(—O—CF($CF_3$)$CF_2$—)$_n$ where n is 1, 2, 3, 4 or 5

(—O—CF($CF_2$$CF_3$)$CF_2$—)$_n$ where n is 1, 2 or 3

(—O—$CF_2$CF($CF_3$)—)$_n$—O—$CF_2$$CF_2$— where n is 1, 2, 3 or 4

(—O—$CF_2$CF($CF_2$$CF_3$)—)$_n$—O—$CF_2$$CF_2$— where n is 1, 2 or 3

(—O—CF($CF_3$)$CF_2$—)$_n$—O—$CF_2$$CF_2$— where n is 1, 2, 3 or 4

(—O—CF($CF_2$$CF_3$)$CF_2$—)$_n$—O—$CF_2$$CF_2$— where n is 1, 2 or 3

—O—($CF_2$)$_n$— where n is 1, 2, 3, 4, 5, 6, 7, 8, 9, 10, 11, 12, 13 or 14

R is typically —O—$CF_2$$CF_2$$CF_2$$CF_2$—$SO_2$X or —O—$CF_2$—CF($CF_3$)—O—$CF_2$$CF_2$—$SO_2$X and most typically —O—$CF_2$$CF_2$$CF_2$$CF_2$—$SO_2$X, where X is F, Cl, Br, OH, or —O$^-$M$^+$, but most typically OH.

The fluoromonomer providing first side group R may be synthesized by any suitable means, including methods disclosed in U.S. Pat. No. 6,624,328.

In addition, the fluoropolymer includes second pendant groups Q containing Br, Cl or I, typically Br. The second pendant group may be derived from a co-monomer according to the formula $CF_2$=CY-Q where Y is typically F but may also be $CF_3$, and where Q is a second pendent group which includes Br, Cl or I. In an alternative embodiment, second pendant groups Q may be added to the backbone by grafting. Typically, second pendant groups Q are highly fluorinated and more typically perfluorinated, other than at the bromine position. Typically, Q is —R$^1$—Br, where R$^1$ is as described above. Alternately, Q is Br, Cl or I, typically Br.

Most typically, the fluoropolymer is a terpolymer of TFE, $CF_2$=CY—R as described above, and $CF_2$=CY-Q as described above.

The polymer to be crosslinked may be made by any suitable method, including emulsion polymerization, extrusion polymerization, polymerization in supercritical carbon dioxide, solution or suspension polymerization, and the like, which may be batchwise or continuous.

In one embodiment, chain transfer agents may be used during polymerization to provide a polymer with Cl, Br or I end groups. Where such end groups are present, they may be considered pendant groups for the purposes of the present invention. Examples of chain transfer agents include those having the formula RX$_n$, wherein R is an n-valent alkyl group containing 1-12 carbon atoms, which may be fluorinated or unfluorinated, and wherein X's are independently selected from Cl, Br or I. Additional chain transfer agents are exemplified in U.S. Pat. Nos. 4,000,356 and 6,380,337, incorporated herein by reference. In addition, the polymerization can be performed in the presence of I$^-$/Br$^-$ salts in order to introduce terminal Br or I endgroups, as described in EP 407 937, incorporated herein by reference.

The acid-functional pendent groups typically are present in an amount sufficient to result in an hydration product (HP) of greater than 15,000, more typically greater than 18,000, more typically greater than 22,000, and most typically greater than 25,000. In general, higher HP correlates with higher ionic conductance.

The acid-functional pendent groups typically are present in an amount sufficient to result in an equivalent weight (EW) of less than 1200, more typically less than 1100, and more typically less than 1000, and more typically less than 900.

Typically, the polymer is formed into a membrane prior to crosslinking. Any suitable method of forming the membrane may be used. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. Typically the membrane has a thickness of 90 microns or less, more typically 60 microns or less, and most typically 30 microns or less. A thinner membrane may provide less resistance to the passage of ions. In fuel cell use, this results in cooler operation and greater output of usable energy. Thinner membranes must be made of materials that maintain their structural integrity in use.

The step of crosslinking comprises the step of exposing the fluoropolymer to electron beam radiation so as to result in the formation of crosslinks. Typically, the electron beam radiation is in a dose of 1 Mrad or more, more typically 3 Mrad or more, more typically 5 Mrad or more, and most typically 15 Mrad or more. Any suitable apparatus may be used. A continuous process of exposure may be used to treat roll good membranes.

Optionally a crosslinking agent may be added. The crosslinking agent may be added by any suitable method, including blending with the polymer before forming into a membrane and application of the crosslinking agent to the membrane, e.g. by immersion in a solution of the crosslinking agent. Typical agents may include multifunctional compounds such as multifunctional alkenes, multifunctional acrylates, multifunctional vinyl ethers, and the like, which may be non-fluorinated or fluorinated to a low level but which are more typically highly fluorinated and more typically perfluorinated.

In a further embodiment, the polymer may be imbibed into a porous supporting matrix prior to crosslinking, typically in the form of a thin membrane having a thickness of 90 microns or less, more typically 60 microns or less, and most typically 30 microns or less. Any suitable method of imbibing the polymer into the pores of the supporting matrix may be used, including overpressure, vacuum, wicking, immersion, and the like. The blend becomes embedded in the matrix upon crosslinking. Any suitable supporting matrix may be used. Typically the supporting matrix is electrically non-conductive. Typically, the supporting matrix is composed of a fluoropolymer, which is more typically perfluorinated. Typical matrices include porous polytetrafluoroethylene (PTFE), such as biaxially stretched PTFE webs.

It will be understood that polymers and membranes made according to the method of the present invention may differ in chemical structure from those made by other methods, in the structure of crosslinks, the placement of crosslinks, the placement of acid-functional groups, the presence or absence of crosslinks on pendent groups or of acid-functional groups on crosslinks, and the like.

This invention is useful in the manufacture of strengthened polymer electrolyte membranes for use in electrolytic cells such as fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Polymer

The polymer electrolyte used in the present examples was made by emulsion co-polymerization of tetrafluoroethylene (TFE) with $CF_2=CF-O-(CF_2)_4-SO_2F$ (MV4S), which was synthesized by the method disclosed in U.S. Pat. No. 6,624,328, the disclosure of which is incorporated herein by reference, and with $CF_2=CF-O-(CF_2)_2-Br$ (MV2Br).

130 g MV4S was preemulsified in water with 15 g APFO emulsifier (ammonium perfluorooctanoate, $C_7F_{15}COONH_4$) under high shear (24,000 rpm), using an ULTRA-TURRAX® Model T 25 disperser S25 KV-25F (IKA-Werke GmbH & Co. KG, Staufen, Germany) for 2 min. A 4 liter polymerization kettle equipped with an impeller agitator system was charged with 3.1 kg deionized water. The kettle was heated up to 50° C. and then the preemulsion was charged into the oxygen-free polymerization kettle. At 50° C. the kettle was further charged with 6 g MV2Br and 178 g gaseous tetrafluoroethylene (TFE) to 8 bar absolute reaction pressure. At 50° C. and 240 rpm agitator speed the polymerization was initiated by addition of 15 g sodium disulfite and 40 g ammonium peroxodisulfate. During the course of the reaction, the reaction temperature was maintained at 50° C. Reaction pressure was maintained at 6.0 bar absolute by feeding additional TFE into the gas phase. A second portion of MV4S-preemulsion was prepared in the same manner and proportions described above, using 427 g MV4S. The second preemulsion portion was fed into the liquid phase during the course of the reaction continuously. An additional 26 g MV2Br was also continuously fed into the reactor during the course of the reaction.

After feeding 800 g TFE, the monomer valve was closed and the monomer feed interrupted. The continuing polymerization reduced the pressure of the monomer gas phase to 2.9 bar. At that time, the reactor was vented and flushed with nitrogen gas.

The polymer dispersion thus obtained was mixed with 2-3 equivalents of LiOH and 2 equivalents of $Li_2CO_3$ (equivalents based on sulfonyl fluoride concentration) and enough water to make a 20% polymer solids mixture. This mixture was heated to 250° C. for four hours. Most (>95%) of the polymer became dispersed under these conditions. The dispersions were filtered to remove LiF and undispersed polymer, and then ion exchanged on Mitsubishi Diaion SKT10L ion exchange resin to give the acid form of the ionomer. The resulting polymer electrolyte is a perfluorinated polymer with acidic side chains according to the formula: $-O-(CF_2)_4-SO_3H$ and side chains according to the formula $-O-(CF_2)_2-Br$. The resulting mixture was an acid dispersion at 18 to 19% polymer solids. This dispersion was mixed with n-propanol and then concentrated in vacu to give the desired 20% solids dispersion in a water/n-propanol solvent mixture of about 30% water/70% n-propanol. This base dispersion was used to cast membranes.

Membranes

Polymer membrane samples for testing were cast by knife coating out of a water/propanol suspension (40% water/60% n-propanol) containing 20% solids onto a glass plate, dried at 80° C. for 10 minutes, and annealed at 200° C. for 10 minutes. The thickness of the resulting films was approximately 30 microns. The films were then removed from the glass plate, cut into strips, placed in polyethylene bags and purged with nitrogen.

E-Beam

The membrane samples were exposed to an e-beam source. (Energy Sciences CB300, Energy Sciences, Inc., Wilmington, Mass.). The dose was controlled to 2 Mrad per pass. Samples were subjected to 0, 1 or 3 passes for a total e-beam dose of 0, 2 or 6 Mrad.

Analysis

Tg was measured by dynamic mechanical analysis (DMA) for the samples exposed to e-beam doses of 0, 2 or 6 Mrad. In DMA, a sample of a polymer to be tested is clamped in a test apparatus that applies an oscillating force and measures the resulting displacement of the sample. The process is carried out in a temperature controlled environment. Temperature is ramped upward as measurements are taken. From this data, the apparatus typically calculates, records and displays the elastic modulus (E'), loss modulus (E"), and damping factor (tan delta) of the sample as a function of temperature. Tg is taken to be the maximum in tan delta.

In the present examples, a Rheometrics Solid Analyzer RSA II (TA Instruments, New Castle, Del., USA) was used at a frequency of 1 Hertz (6.28 rad/sec). A thin strip of sample was tested, measuring about 6.5 mm wide by about 25 mm long. Measurements were taken under tension over the temperature range of 25° C. to 200° C.

Figure 2:
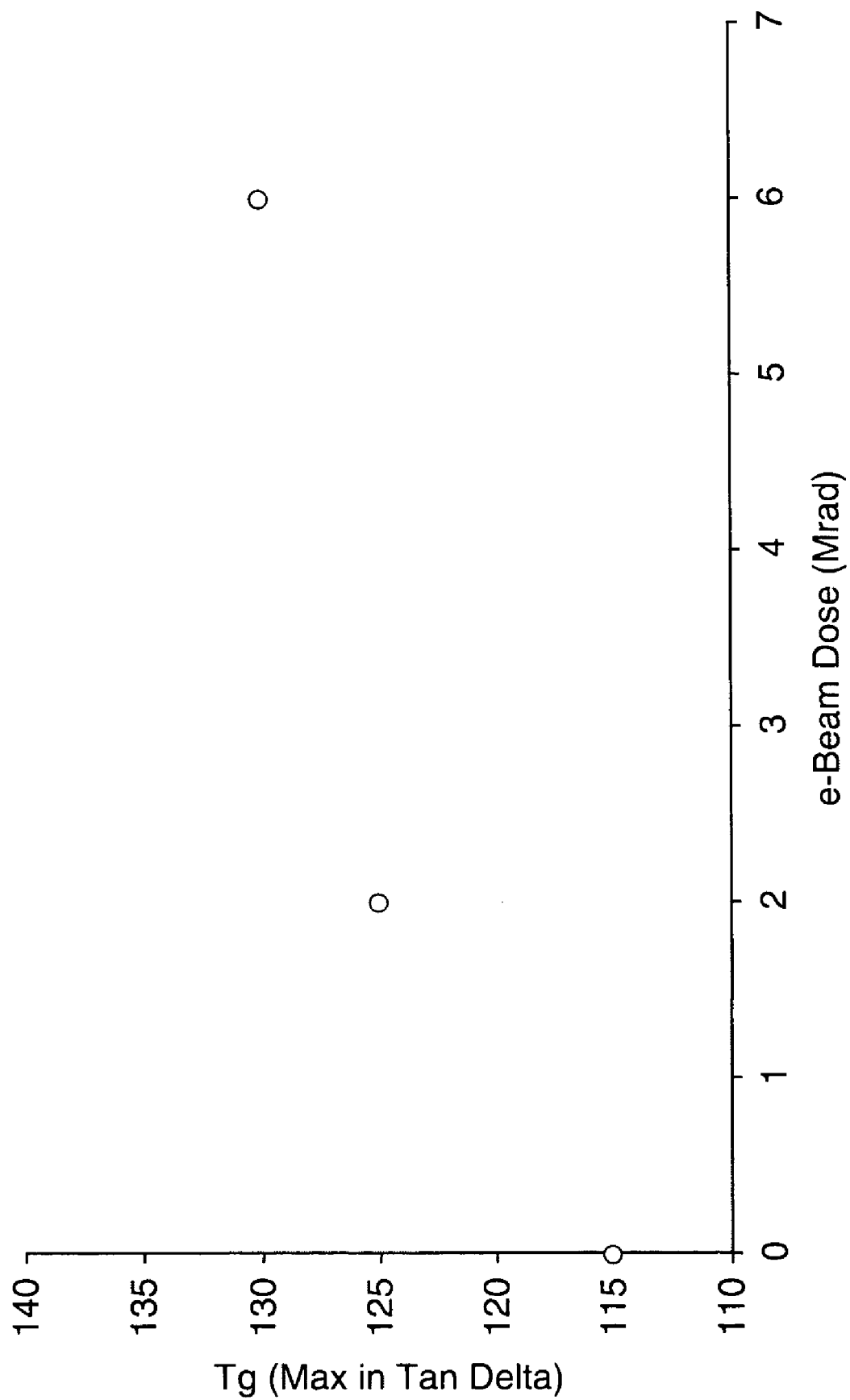
FIG. 2 is a graph demonstrating Tg for one comparative polymer (0 Mrad) and two polymers according to the present invention (2 Mrad, 6 Mrad).

FIG. 1 is a graph showing DMA results at each dose. Trace A represents 0 Mrad (Comparative), trace B represents 2 Mrad (Invention) and trace C represents 6 Mrad (Invention). FIG. 2 is a graph showing Tg at each dose, where Tg is taken as a maximum in the tan delta data represented in FIG. 1. Tg is elevated for the sample exposed to 2 Mrad of e-beam radiation, indicating that crosslinking has occurred. Tg is further elevated for the sample exposed to 6 Mrad of e-beam radiation.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a crosslinked polymer comprising the steps of:
   a) providing a highly fluorinated fluoropolymer comprising: a backbone derived in part from tetrafluoroethylene monomer, first pendent groups which include a group according to the formula —SO2X, where X is F, Cl, Br, OH or O-M+, where M+ is a monovalent cation, and second pendent groups which include Br; and
   b) exposing said fluoropolymer to electron beam radiation so as to result in the formation of crosslinks.

2. The method according to claim 1 wherein said method additionally comprises, prior to said step b), the step of:
   c) forming said fluoropolymer into a membrane.

3. The method according to claim 1 wherein said membrane has a thickness of 90 microns or less.

4. The method according to claim 1 wherein said step of exposing said fluoropolymer to electron beam radiation comprises exposing said fluoropolymer to greater than 1 Mrad of electron beam radiation.

5. The method according to claim 1 wherein said step of exposing said fluoropolymer to electron beam radiation comprises exposing said fluoropolymer to greater than 3 Mrad of electron beam radiation.

6. The method according to claim 1 wherein said step of exposing said fluoropolymer to electron beam radiation comprises exposing said fluoropolymer to greater than 15 Mrad of electron beam radiation.

7. The method according to claim 1 wherein said highly fluorinated fluoropolymer is perfluorinated.

8. The method according to claim 1 wherein said pendent groups are according to the formula R1 SO2X, where R1 is a branched or unbranched perfluoroalkyl or perfluoroether group comprising 1-15 carbon atoms and 0-4 oxygen atoms, and where X is F, Cl, Br, OH or O-M+, where M+ is a monovalent cation.

9. The method according to claim 1 wherein said pendent groups are groups according to the formula —O—(CF2)4-SO2X, where X is F, Cl, Br, OH or O-M+, where M+ is a monovalent cation.

10. The method according to claim 1 wherein said pendent groups are groups according to the formula —O—(CF2)4-SO3H.

11. The method according to claim 2 wherein said pendent groups are according to the formula R1 SO2X, where R1 is a branched or unbranched perfluoroalkyl or perfluoroether group comprising 1-15 carbon atoms and 0-4 oxygen atoms, and where X is F, Cl, Br, OH or O-M+, where M+ is a monovalent cation.

12. The method according to claim 2 wherein said pendent groups are groups according to the formula —O—(CF2)4-SO2X, where X is F, Cl, Br, OH or O-M+, where M+ is a monovalent cation.

13. The method according to claim 2 wherein said pendent groups are groups according to the formula —O—(CF2)4-SO3H.

14. The method according to claim 3 wherein said pendent groups are according to the formula R1 SO2X, where R1 is a branched or unbranched perfluoroalkyl or perfluoroether group comprising 1-15 carbon atoms and 0-4 oxygen atoms, and where X is F, Cl, Br, OH or O-M+, where M+ is a monovalent cation.

15. The method according to claim 3 wherein said pendent groups are groups according to the formula —O—(CF2)4-SO2X, where X is F, Cl, Br, OH or O-M+, where M+ is a monovalent cation.

16. The method according to claim 3 wherein said pendent groups are groups according to the formula —O—(CF2)4-SO3H.

17. The method according to claim 4 wherein said pendent groups are according to the formula R1 SO2X, where R1 is a branched or unbranched perfluoroalkyl or perfluoroether group comprising 1-15 carbon atoms and 0-4 oxygen atoms, and where X is F, Cl, Br, OH or O-M+, where M+ is a monovalent cation.

18. The method according to claim 4 wherein said pendent groups are groups according to the formula —O—(CF2)4-SO2X, where X is F, Cl, Br, OH or O-M+, where M+ is a monovalent cation.

19. The method according to claim 4 wherein said pendent groups are groups according to the formula —O—(CF2)4-SO3H.

20. The method according to claim 1 wherein step c) comprises imbibing said fluoropolymer into a porous supporting matrix.

21. The method according to claim 20 wherein said porous supporting matrix is a porous polytetrafluoroethylene web.

* * * * *

UNITED STATES PATENT AND TRADEMARK OFFICE
CERTIFICATE OF CORRECTION

PATENT NO. : 7,265,162 B2
APPLICATION NO. : 10/712590
DATED : September 4, 2007
INVENTOR(S) : Michael A. Yandrasits et al.

It is certified that error appears in the above-identified patent and that said Letters Patent is hereby corrected as shown below:

Drawings

In the drawings, Sheet 1, Fig. 1, delete "(dyn/cm2)" and insert -- (dyn/cm$^2$) -- therefor.

Column 3

Line 20; delete "M$^{30}$" and insert -- M$^+$ -- therefor.

Line 38; delete "—CF$_2$ 1, 2, 3, or 4" and insert -- —CF$_2$– 1, 2, 3, or 4 -- therefor.

Column 7

Claim 1, Line 24; delete "–SO2X", and insert -- –SO$_2$X -- therefor.

Claim 1, Line 25; delete "O-M+, where M+" and insert -- –O$^-$M$^+$, where M$^+$ -- therefor.

Claim 8, Line 49; delete "R1 SO2X, where R1" and insert -- –R$^1$–SO$_2$X, where R$^1$ -- therefor.

Claim 8, Line 52; delete "O-M+, where M+" and insert -- –O$^-$M$^+$, where M$^+$ -- therefor.

Claim 9, line 55 – 56; delete "–O–(CF2)4–SO2X, where X is F, Cl, Br, OH or O-M+, where M+" and insert -- –O–(CF$_2$)$_4$–SO$_2$X, where X is F, Cl, Br, OH or –O$^-$M$^+$, where M$^+$ -- therefor.

Column 8

Claim 10, Line 3; delete "(CF2)4–SO3H." and insert -- –(CF$_2$)$_4$–SO$_3$H. -- therefor.

Claim 11, Line 6; delete "R1 SO2X, where R1" and insert -- –R$^1$–SO$_2$X, where R$^1$ -- therefor.

Claim 11, Line 9; delete "O-M+, where M+" and insert -- –O$^-$M$^+$, where M$^+$ -- therefor.

Claim 12, Line 13 and 14; delete "(CF2)4–SO2X, where X is F, Cl, Br, OH or O-M+, where M+" and insert -- (CF$_2$)$_4$–SO$_2$X, where X is F, Cl, Br, OH or –O$^-$M$^+$, where M$^+$ -- therefor.

Claim 13, Line 18; delete "(CF2)4–SO3H." and insert -- (CF$_2$)$_4$–SO$_3$H. -- therefor.

UNITED STATES PATENT AND TRADEMARK OFFICE
CERTIFICATE OF CORRECTION

PATENT NO. : 7,265,162 B2
APPLICATION NO. : 10/712590
DATED : September 4, 2007
INVENTOR(S) : Michael A. Yandrasits et al.

It is certified that error appears in the above-identified patent and that said Letters Patent is hereby corrected as shown below:

Column 8

Claim 14, Line 21; delete "R1 SO2X, where R1" and insert -- $-R^1-SO_2X$, where $R^1$ -- therefor.

Claim 14, Line 24; delete "O-M+, where M+" and insert -- $-O^-M^+$, where $M^+$ -- therefor.

Claim 15, Line 28; delete "(CF2)4–SO2X, where X is F, Cl, Br, OH or O-M+, where M+" and insert -- $(CF_2)_4-SO_2X$, where X is F, Cl, Br, OH or $-O^-M^+$, where $M^+$ -- therefor.

Claim 16, Line 33; delete "(CF2)4–SO3H." and insert -- $(CF_2)_4-SO_3H.$ -- therefor.

Claim 17, Line 36; delete "R1 SO2X, where R1" and insert -- $-R^1-SO_2X$, where $R^1$ -- therefor.

Claim 17, Line 39; delete "O-M+, where M+" and insert -- $-O^-M^+$, where $M^+$ -- therefor.

Claim 18, Line 43 and 44; delete "(CF2)4–SO2X, where X is F, Cl, Br, OH or O-M+, where M+" and insert -- $(CF_2)_4-SO_2X$, where X is F, Cl, Br, OH or $-O^-M^+$, where $M^+$ -- therefor.

Claim 19, Line 49; delete "(CF2)4–SO3H." and insert -- $(CF_2)_4-SO_3H.$ -- therefor.

Signed and Sealed this

Thirteenth Day of May, 2008

JON W. DUDAS
*Director of the United States Patent and Trademark Office*